United States Patent
Minto (10) Patent No.: US 10,787,229 B2
(45) Date of Patent: Sep. 29, 2020

(54) BICYCLE DERAILLEUR (71) Applicant: Campagnolo S.r.l., Vicenza (IT)

(72) Inventor: Marco Minto, Mirano (IT)

(73) Assignee: Campagnolo S.r.l., Vicenza (IT)

( * ) Notice: Subject to any disclaimer, the term of this patent is extended or adjusted under 35 U.S.C. 154(b) by 198 days.

(21) Appl. No.: 15/902,226

(22) Filed: Feb. 22, 2018

(65) Prior Publication Data

US 2018/0244347 A1 Aug. 30, 2018

(30) Foreign Application Priority Data

Feb. 24, 2017 (IT) .......................... 102017000021438

(51) Int. Cl.
*B62M 9/137* (2010.01)
*B62M 9/1342* (2010.01)
*B62M 9/135* (2010.01)

(52) U.S. Cl.
CPC ............ *B62M 9/137* (2013.01); *B62M 9/135* (2013.01); *B62M 9/1342* (2013.01)

(58) Field of Classification Search
CPC .... B62M 9/127; B62M 9/1342; B62M 9/135; B62M 9/137
See application file for complete search history.

(56) References Cited

U.S. PATENT DOCUMENTS

| | | | |
|---|---|---|---|
| 4,362,522 A | 12/1982 | Huret | |
| 4,507,101 A | 3/1985 | Nagano | |
| 5,037,355 A | 8/1991 | Kobayashi | |
| 6,629,903 B1 * | 10/2003 | Kondo | B62M 9/1346 474/80 |
| 7,081,058 B2 * | 7/2006 | Nankou | B62M 9/1342 474/80 |

(Continued)

FOREIGN PATENT DOCUMENTS

| | | |
|---|---|---|
| DE | 20 2012 004 089 U1 | 7/2012 |
| EP | 2 578 487 B1 | 10/2015 |
| EP | 3 000 711 A1 | 3/2016 |

OTHER PUBLICATIONS

Campagnolo 6-9 Umwerfer-Schaltzugplatte fur Escape/QS(TM) Ergopo, Dec. 31, 2009 (Dec. 31, 2009), XP055419240, https://www.bike-components.de. Retrieved from the Internet: URL:https:jjwww.bike-components.de/enjCampagnolo/Umwerfer-Schaltzugplatte-fuer-Escap e-QS-Ergopower-Modell-2008-2009-p43338/ [retrieved on Oct. 25, 2017] *figure 1*.

(Continued)

*Primary Examiner* — Minh Truong
(74) *Attorney, Agent, or Firm* — Volpe and Koenig, P.C.

(57) ABSTRACT

A derailleur comprising a chain guide, a fixed body adapted for being fixedly associated with a part of frame of the bicycle, and an actuation arm hinged to the fixed body. A cable-clamping washer constrained to the actuation arm locks a control cable on the actuation arm. A first fastening station and a second fastening station are defined on said actuation arm and configured to fasten the control cable in different positions on the actuation arm. An anti-rotation appendage projecting from the chain-clamping washer is adapted for being inserted in a holding seat of the actuation arm and holding the control cable in at least one of the first and the second fastening stations.

16 Claims, 6 Drawing Sheets

(56) References Cited

U.S. PATENT DOCUMENTS

| | | | |
|---|---|---|---|
| 7,438,658 B2* | 10/2008 | Tetsuka | B62M 9/1342 |
| | | | 474/122 |
| 9,067,641 B2 | 6/2015 | Kuwayama et al. | |
| 2002/0033067 A1 | 3/2002 | Takachi | |
| 2002/0165054 A1 | 11/2002 | Chen | |
| 2008/0026891 A1 | 1/2008 | Oseto | |
| 2016/0121967 A1* | 5/2016 | Nishino | |
| 2016/0229488 A1* | 8/2016 | Kuwayama | B62M 9/1344 |
| 2018/0244346 A1* | 8/2018 | Minto | B62M 9/1342 |

OTHER PUBLICATIONS

Italian Search Report and Written Opinion in Italian Application No. 102017000021438, dated Oct. 26, 2017, with English translation.

\* cited by examiner

BICYCLE DERAILLEUR

CROSS REFERENCE TO RELATED APPLICATION

This application claims the benefit of Italian Application No. 102017000021438, filed on Feb. 24, 2017, which is incorporated herein by reference as if fully set forth.

FIELD OF INVENTION

The present solution relates to a bicycle derailleur, preferably for a racing bicycle.

BACKGROUND

As known, derailleurs, whether front or rear, are used to move the transmission chain from one toothed wheel of the crankset or of the cassette to another toothed wheel of different diameter to carry out gearshifting, by changing the gear ratio.

The movement of the derailleur is obtained through an actuation device mounted on the handlebars so as to be easily maneuvered by the cyclist.

In a mechanical gearshift, the front derailleur is for example moved between the crown gears of the crankset, upwards by a traction action exerted by a normally sheathed inextensible control cable (commonly called Bowden cable), and downwards by the release of the traction of the control cable.

The derailleur comprises a chain guide (or cage) positioned above the transmission chain and a positioning mechanism of the chain guide that is fixed to the frame of the bicycle along the tube that connects the bottom bracket to the saddle ("seat-tube").

The chain guide is formed from an inner plate and an outer plate facing one another and substantially parallel. The inner plate acts by thrusting on the chain to carry out the passage thereof from a crown having a small diameter to one having a larger diameter (upward gearshifting) and the outer plate acts by thrusting on the chain to carry out the passage thereof from a crown having a larger diameter to one having a smaller diameter (downward gearshifting).

The positioning mechanism of the chain guide is usually formed by a deformable articulated quadrilateral. Such an articulated quadrilateral comprises a fixed body (first side of the quadrilateral) fixedly connected to a strap for the connection about the seat tube, two connecting rods (inner connecting rod and outer connecting rod, which form another two sides of the quadrilateral) rotatably connected to the fixed body about two respective axes and the body of the chain guide itself (which forms the fourth side and completes the articulated quadrilateral) rotatably connected to each of the two connecting rods about two further respective axes. The four axes are parallel to one another.

The outer connecting rod is hinged at the top to the fixed body about the first of the four axes and extends at the top beyond such an axis with an actuation arm to the end of which the control cable of the derailleur is connected.

When the control cable is pulled, the actuation arm is actuated and the outer connecting rod rotates about the first axis. The parallelogram is thus deformed, with the chain guide that is moved outwards to carry out gearshifting.

The control cable usually reaches the actuation arm coming from an area of the bicycle arranged below the front derailleur.

In some solutions, the sheath of the control cable is fixed to the seat tube, or to another tube of the frame of the bicycle, to reach an area close to the bottom bracket and then rise towards the front derailleur.

In other solutions, the sheath of the control cable is inserted inside the seat tube, or another tube of the frame of the bicycle, to then emerge from a hole in the frame arranged below the front derailleur.

It is known that, for the same geometry of the articulated quadrilateral, the parameters that influence the movement ratio (defined as the ratio between the movement of the chain guide and the extent of the movement of the control cable determined by the traction thereof) include the following two parameters.

The first is the distance, measured along a direction perpendicular to the four articulation axes of the articulated quadrilateral, between the exit point of the control cable from the frame (or from the support of the control cable) and the articulation axis of the actuation arm, in other words the distance between the exit point of the control cable and the derailleur.

The second is the angle formed between the articulation axis of the actuation arm and the point of application of the traction force of the control cable on the actuation arm.

As the distance given by the first parameter or the angle given by the second parameter increases, the movement ratio decreases.

As the distance given by the first parameter or the angle given by the second parameter decreases, the movement ratio increases.

In order to obtain predetermined movements of the chain guide, which determine precise gearshifting operations, the front derailleurs are therefore mounted with very narrow tolerances, so as to obtain combinations between the aforementioned first and the second parameter that fall within predetermined limits.

However, it may be that the first parameter, in other words the distance between the exit point of the control cable and the derailleur, does not correspond to the design specifications and that the control cable comes out from the frame at a different point from that required for correct installation of the derailleur (very often the manufacturers of frames are not the same as the manufacturers of the bicycle components).

Document EP3000711A1 describes a fastening system of the control cable in which a fastening portion has a central hole for being fixed with a bolt in a threaded hole of the actuation arm. The fastening portion comprises a deviating projection that extends away from the peripheral edge of the fastening portion. As a function of the relative position between the fastening portion and the actuation arm, the deviating projection does or does not intercept the control cable. In particular, when the deviating projection does not intercept the control cable, the latter has a path in a straight line with a first point of application of the traction force of the control cable on the actuation arm. When the fastening portion is oriented so that the deviating projection intercepts the control cable, the latter is deviated defining a second point of application of the traction force of the control cable on the actuation arm.

SUMMARY

The Applicant has perceived that it would be advantageous changing the point of application of the traction force of the control cable on the actuation arm so as to compensate possible incorrect distances between the exit of the control cable from the frame and the derailleur.

The Applicant has also perceived that such a change of the point of application of the traction force of the control cable on the actuation arm should be easily actuated by those in charge of mounting and/or maintaining the bicycle, avoiding their complicated adjustments and/or complexity of installation.

BRIEF DESCRIPTION OF THE DRAWINGS

Further features and advantages of the solution will become clearer from the following description of preferred embodiments thereof, made with reference to the attached drawings. In such drawings.

DETAILED DESCRIPTION OF THE PREFERRED EMBODIMENTS

The present solution therefore relates to a bicycle derailleur comprising:
a chain guide configured to interact with a transmission chain of the bicycle and movable between a plurality of intermediate positions comprised between an inner position and an outer position;
a fixed body configured for being fixedly associated with a part of frame of the bicycle;
an outer connection element rotatably connected to the fixed body about a first articulation axis and rotatably connected to the chain guide about a second articulation axis parallel to the first articulation axis;
an inner connection element rotatably connected to the fixed body about a third articulation axis and to the chain guide about a fourth articulation axis;
an actuation arm hinged to the fixed body about the first articulation axis;
a cable-clamping washer configured for being fixedly connected to the actuation arm and configured for locking a control cable on the actuation arm,
a first fastening station and a second fastening station defined on said actuation arm and configured to fasten the control cable in different positions on the actuation arm;
an anti-rotation appendage projecting from said chain-clamping washer and configured for being inserted in a holding seat of the actuation arm, in at least one from the first and the second fastening station.

The first fastening station determines a first point, or area, of application of the traction force of the control cable on the actuation arm and the second fastening station determines a second point, or area, different from the first, of application of the traction force of the control cable on the actuation arm.

The cable-clamping washer has the task of locking the control cable on the actuation arm.

By providing the cable-clamping washer with an anti-rotation appendage inserted in a seat of the actuation arm, the cable-clamping washer is prevented, by mechanical interference between the anti-rotation appendage and the seat of the actuation arm, from making rotation, or in any case movements, with respect to the actuation arm.

The Applicant has perceived that by arranging the anti-rotation appendage of the cable-clamping washer so that it abuts the control cable and defines a first contact surface for the control cable in at least one from the first and the second fastening station, the forced insertion of the anti-rotation appendage in the seat of the actuation arm unequivocally and certainly determines at least one of the two possible points of application of the traction force of the control cable on the actuation arm.

In this way, the setting of the derailleur to obtain a movement ratio as close as possible to what was designed is very quick and simple, if nothing else in relation to at least one of the two fastening stations of the control cable to the actuation arm, since the position of the anti-rotation appendage is forced and not left to the perception of the person in charge of mounting and/or maintaining the bicycle.

The bicycle derailleur of the present solution can comprise one or more of the following preferred features, taken individually or in combination.

Preferably, said anti-rotation appendage comprises a contact surface adapted for supporting the control cable in said at least one from the first and the second fastening station.

Preferably, said anti-rotation appendage and said holding seat of the actuation arm extend along directions parallel to said first articulation axis.

Preferably, in the second fastening station said anti-rotation appendage of the cable-clamping washer is switchable so as to be inserted in a further holding seat of the actuation arm; said anti-rotation appendage having a second contact surface for the control cable.

In this way, also in the other fastening station the control cable can be fastened in an unequivocal and certain manner, making the setting of the front derailleur very quick and simple in both fastening stations.

Preferably, the cable-clamping washer has a single anti-rotation appendage; the insertion of the anti-rotation appendage in the holding seat or in the further holding seat defines an unequivocal position of the cable-clamping washer with respect to the actuation arm.

Preferably, said holding seat and said further holding seat extend according to directions parallel to one another and parallel to said anti-rotation appendage.

Preferably, said anti-rotation appendage is positioned so that the distance between said first contact surface thereof and a plane containing the first and the second articulation axis is different from the distance between said second contact surface thereof and the same plane.

In this way, the points or areas of application of the traction force of the control cable on the actuation arm are different from one another and the first and the second fastening station make different movement ratios when engaged by the control cable.

Preferably, the first and the second contact surface of the anti-rotation appendage are defined on different portions of the anti-rotation appendage itself.

Preferably, the second contact surface is arranged a greater distance from a center of the cable-clamping washer with respect to the distance of the first contact surface from said center.

Preferably, said holding seat and said further holding seat are grooves formed on a side surface of the actuation arm.

In a first alternative embodiment, in the second fastening station said cable-clamping washer comprises a further anti-rotation appendage adapted for being inserted in a further holding seat of the actuation arm; said further anti-rotation appendage having a second contact surface for the control cable.

In this way, also in the second fastening station the control cable can be fastened in an unequivocal and certain manner, making the setting of the front derailleur very quick and simple in both fastening stations.

Preferably, the cable-clamping washer has two anti-rotation appendages respectively inserted in the holding seat and in the further holding seat defining a single position of the cable-clamping washer with respect to the actuation arm.

Preferably, said anti-rotation appendage and said further anti-rotation appendage are parallel to one another and angularly spaced.

Preferably, said holding seat and said further holding seat extend according to directions parallel to one another and parallel to said anti-rotation appendage and further anti-rotation appendage.

Preferably, said anti-rotation appendage is positioned so that the distance between said first contact surface thereof and a plane containing the first and the second articulation axis is different from the distance between said second contact surface of said further anti-rotation appendage and the same plane.

In this way, the points or areas of application of the traction force of the control cable on the actuation arm are different from one another and the first and the second fastening station make different movement ratios when engaged by the control cable.

Preferably, the second contact surface is arranged a greater distance from a center of the cable-clamping washer with respect to the distance of the first contact surface from said center.

Preferably, said holding seat and said further holding seat are grooves formed on a side surface of the actuation arm.

In a second alternative embodiment, preferably in the second fastening station, said actuation arm comprises a projection having a second contact surface for the control cable.

The second contact surface defines the point or area of application of the traction force of the control cable on the articulated arm.

In this way, the reference for the constraint of the control cable on the second fastening station is formed on the actuation arm itself, avoiding any possibility of error in the positioning and constraint of the control cable.

Preferably, said projection extends substantially parallel to said anti-rotation appendage.

Preferably, said anti-rotation appendage, engaged with said holding seat, is positioned so that the distance between said first contact surface thereof and a plane containing the first and the second articulation axis is different from the distance between said second contact surface of the projection of the actuation arm and the same plane.

In this way, the points or areas of application of the traction force of the control cable on the actuation arm are different from one another and the first and the second fastening station make different movement ratios when engaged by the control cable.

Preferably, said projection extends away from said actuation arm along a direction parallel to said first articulation axis.

In all of the embodiments, a cable-guiding groove is preferably formed on one from said cable-clamping washer and said actuation arm and is open between said cable-clamping washer and said actuation arm.

The cable-guiding groove has the function of holding the portion of control cable arranged between the cable-clamping washer and the actuation arm in a predetermined position.

Preferably, a further groove is formed on the cable-clamping washer or on said actuation arm; said groove and said further groove being at an angle to one another.

Preferably, said cable-guiding groove is formed on said cable-clamping washer and extends from an area of the cable-clamping washer close to said anti-rotation appendage.

Preferably, the derailleur is a front derailleur.

With reference to the attached figures, a preferred embodiment of the bicycle derailleur in accordance with the present solution is shown. The illustrated derailleur is a front derailleur and is wholly indicated with reference numeral 10.

The front derailleur 10 is preferably a mechanical derailleur, in other words it does not need any electrical and/or electronic device for its operation.

The derailleur 10 comprises a chain guide 11, which is configured to slidably engage a transmission chain of the bicycle (not illustrated) so as to move it from an inner position to an outer position crossing a plurality of intermediate positions between them.

Predetermined positions of the chain guide 11 correspond to predetermined positions of the transmission chain on the crown gears of the crankset.

In particular, the inner position of the chain guide 11 corresponds to a position of the transmission chain on the smallest crown gear of the crankset and the outer position corresponds to a position of the transmission chain on the largest crown gear of the crankset.

The derailleur 10 comprises an inner end stop and an outer end stop (not illustrated) to limit the excursion of the chain guide 11.

The movement of the chain guide 11 is actuated by a deformable quadrilateral 12. The deformable quadrilateral 12 comprises an inner connection element 13, an outer connection element 14, a fixed body 15 and a movable body 16. The chain guide 11 is fixedly connected to the movable body 16 of the deformable quadrilateral 12.

Figure 1:
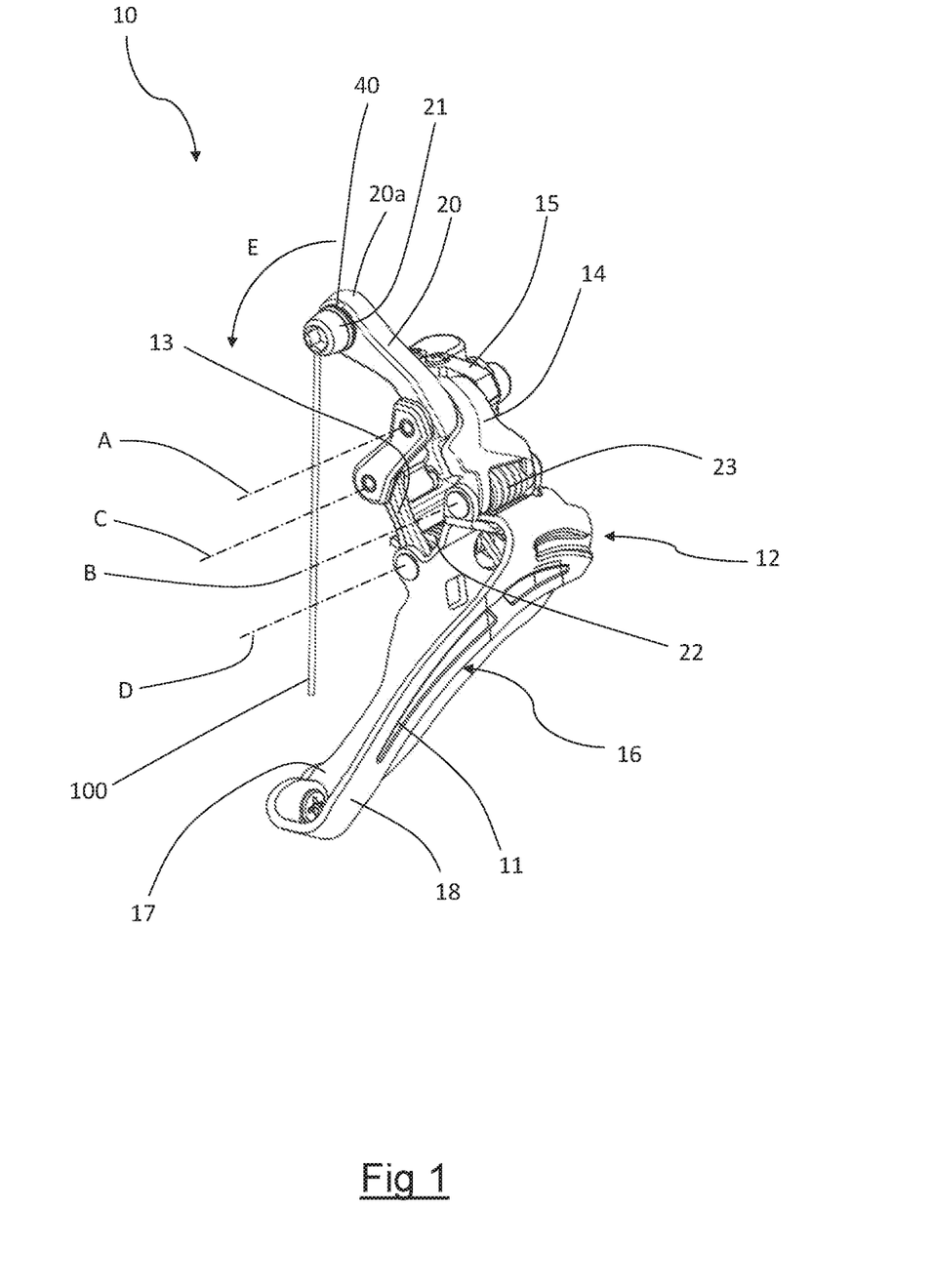
FIG. 1 is a perspective view of a front derailleur equipped with a fastening system of the control cable for a bicycle according to the solution.

As illustrated in FIG. 1, the fixed body 15, the movable body 16 and the two connection elements 13, 14 are articulated to one another along four articulation axes A, B, C, D that are parallel to one another. More precisely, the fixed body 15 and the outer connection element 14 are articulated to one another according to a first articulation axis A; the outer connection element 14 and the movable body 16 are articulated to one another according to a second articulation axis B; the fixed body 15 and the inner connection element 13 are articulated to one another according to a third articulation axis C; the inner connection element 13 and the movable body 16 are articulated to one another according to a fourth articulation axis D.

The movable body 16 comprises an inner plate 17 facing an outer plate 18 that make the chain guide 11. The movable body 16 is also provided with perforated flanges along the fourth articulation axis D for the connection to the inner connection element 13 and with perforated flanges for the connection to the outer connection element 14.

The inner and outer connection elements 13, 14 are kinematically connecting rods, in other words they are elements that are not capable of transmitting pairs of forces to the elements to which they are connected along the respective articulation axes.

Figures 8, 9, 9A:
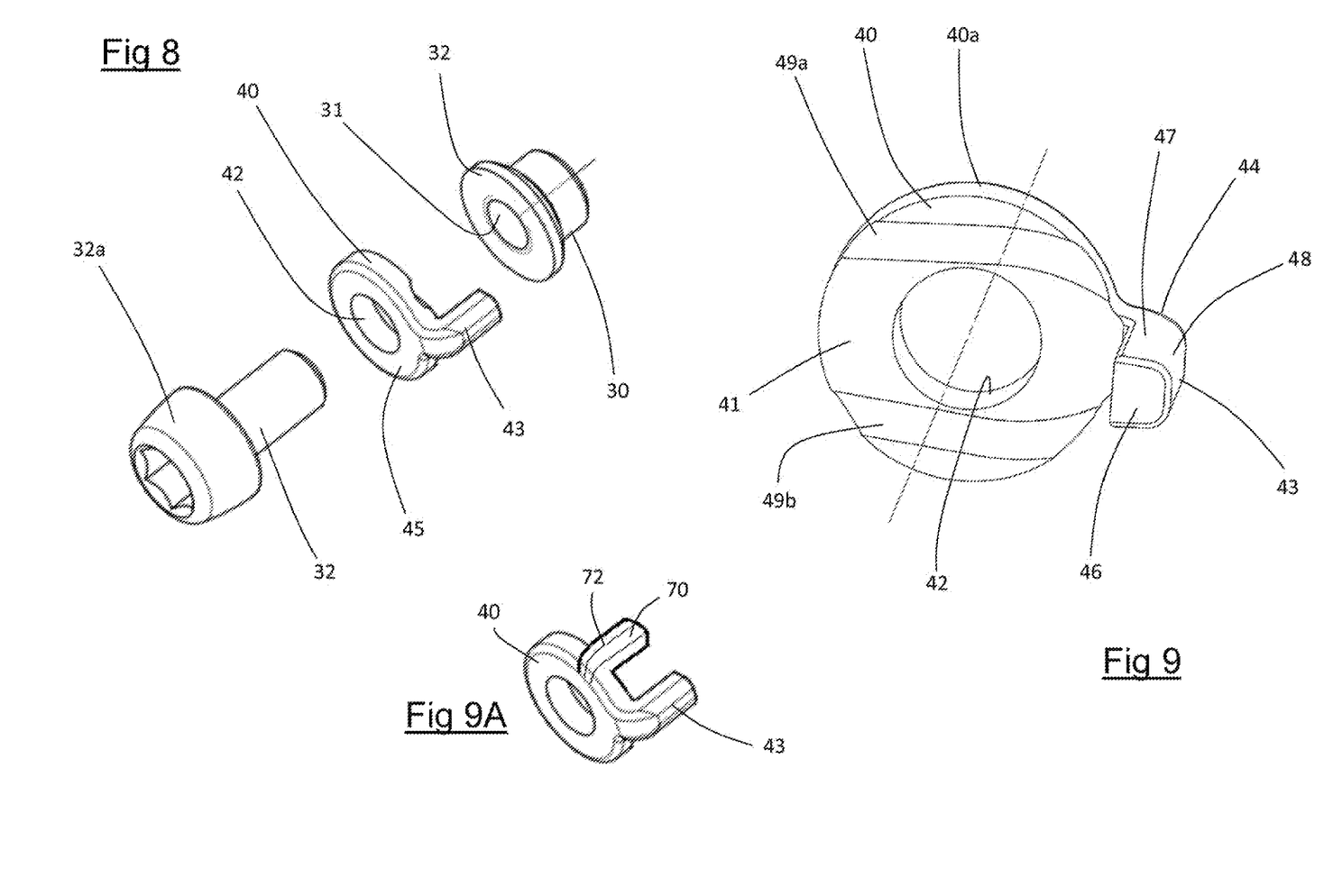
FIGS. 8, 9 and 9A are perspective views of some details of the derailleur of FIG. 1.

The fixed body 15 comprises a collar 19 for attaching to a portion of the seat tube of the frame 101 of the bicycle, as schematically illustrated in FIGS. 8 and 9. The collar 19 allows the derailleur 10 to take up and maintain a predetermined position with respect to the crankset.

In embodiments that are not illustrated, the fixed body 15 can be fixedly connected to the seat tube of the frame of the bicycle without making use of the collar 19, for example welding the fixed body to the seat tube of the frame or constraining the fixed body 15 to an appendage directly formed in the seat tube of the frame.

The derailleur 10 also comprises an actuation arm 20 hinged to the fixed body 15 about the first articulation axis A.

The actuation arm 20 comprises a free end 20a at which a fastening system 21 of the control cable 100 is positioned.

When the control cable 100 is placed under traction by the cyclist (through a dedicated control), the actuation arm 20 rotates in a first angular direction E about the first articulation axis A, setting the outer connection element 14 in rotation with respect to the fixed body 15.

This rotation of the actuation arm 20 and of the outer connection element 14 determines the deformation of the deformable quadrilateral 12 moving the chain guide 11 towards the outer position.

The deformation of the deformable quadrilateral 12 takes place in contrast to a torsional return spring 22. The torsional return spring 22 is arranged on the fourth articulation axis D and is active between the movable body 16 and the inner connection element 13.

The controlled release of the traction of the control cable 100 determines the deformation of the articulated quadrilateral 12 moving the chain guide 11 towards the inner position. The deformation of the articulated quadrilateral 12 takes place under the thrust of the torsional return spring 22.

The actuation arm 20 can be an extension of the outer connection element 14 and can be made in one piece with it.

In the preferred embodiment of the solution, the actuation arm 20 is physically distinct from the outer connection element 14.

In this solution, illustrated in the attached figures, the actuation arm 20 is fixedly connected to the outer connection element 14 for rotations about the first articulation axis A. In the embodiment of the attached figures, a torsional spring 23 acts with a preload, directed along a second angular direction opposite the first angular direction E, between the actuation arm 20 and the outer connection element 14. The torsional spring 23 opposes rotations along the first angular direction A of the actuation arm 20 with respect to the outer connection element 14.

During the entire excursion of the chain guide 11 from the inner position to the outer position, the actuation arm 20 and the outer connection element 14 behave like a rocker arm that oscillates about the first articulation axis A.

Both in the case in which the actuation arm 20 is in one piece with the outer connection element 14, and in the case in which it is a distinct element from it, the free end 20a of the actuation arm 20 is arranged going away from the first articulation axis A on the opposite side with respect to the second articulation axis B, as represented in FIG. 1.

As illustrated in FIGS. 2 to 7, the actuation arm 20 comprises, close to the free end 20a, a first surface 24 and a second end surface 25 which are opposite one another along a first direction F parallel to the first articulation axis A.

Close to the free end 20a, the actuation arm 20 has a side surface 26 which joins together the first 24 and the second surface 25.

The side surface 26 has a portion 27 which faces towards the third C and the fourth articulation axis D, in other words towards the fixed body 15.

A cable-clamping washer 40, better illustrated in FIG. 9, has an inner surface 41 intended to make contact with the actuation arm 20. Between the cable-clamping washer 40 and the actuation arm 20 a free end of the control cable 100 is arranged, so that the cable-clamping washer 40 locks the control cable 100 on the actuation arm 20.

For this purpose, the cable-clamping washer 40 has a hole 42 arranged substantially at the center thereof. The free end 20a of the actuation arm 20 is also provided with a through hole (not visible in the attached figures) which passes through the actuation arm along the first direction F. The through hole in the actuation arm 20 extends between the first 24 and the second surface 25.

A ferrule 30 is inserted inside the through hole, said through hole comprising a cylindrical inner cavity 31 open at both ends. The ferrule 30 can be equipped with a collar 32 (as illustrated in FIG. 8) or it can have a substantially cylindrical shape.

The inner cavity 31 of the ferrule 30 is threaded to receive a bolt 32 which, engaging the hole 42 of the cable-clamping washer 40 locks the cable-clamping washer 40 on the actuation arm 20.

The ferrule 30 is preferably made of steel and the actuation arm 20 is preferably made of aluminum or of an aluminum alloy.

On the actuation arm 20, at the free end 20a there is a first 50 and a second 51 fastening station of the control cable 100. The first and the second fastening station 50, 51 are distinct from one another and have the function of making two different points or areas of application of the traction force of the control cable 100 on the actuation arm 20.

Figure 10:
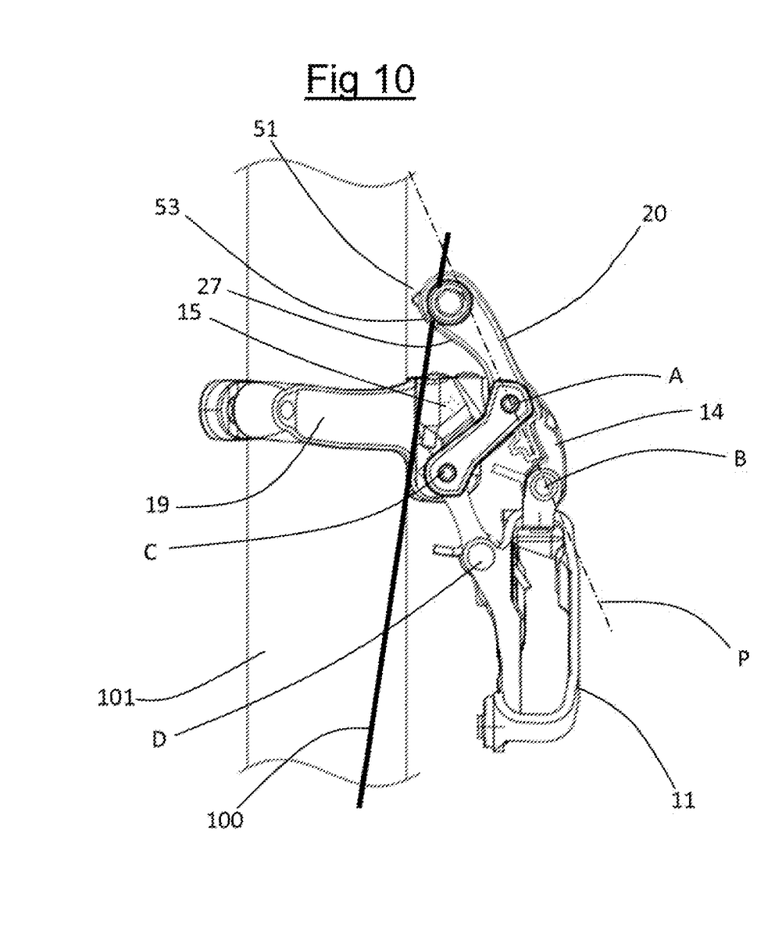
FIGS. 10 and 11 are side views of the derailleur of FIG. 1 in two different operative configurations.
Figure 11:
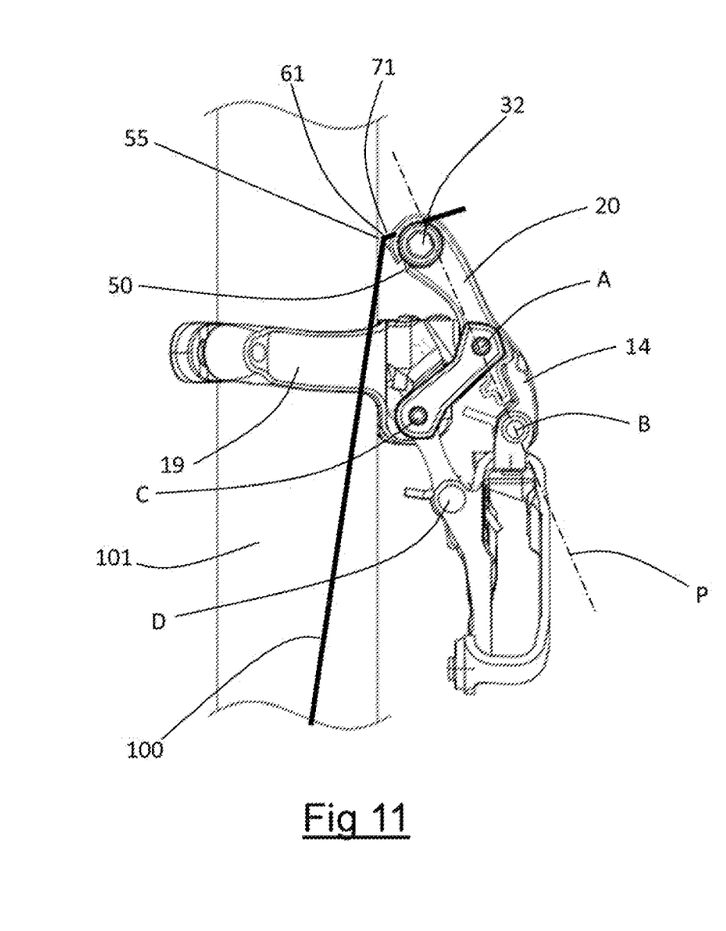

As will become clearer hereinafter, the two points or areas of application of the traction force of the control cable 100 on the actuation arm 20 are arranged at different distances with respect to the plane P (the path of which is represented in FIGS. 10 and 11) which contains both the first A and the second articulation axis B.

The first 50 and the second fastening station 51 are arranged on the portion 27, facing towards the third C and fourth articulation axis D, of the side surface 26 of the actuation arm 20.

The first fastening station 50 is arranged a shorter distance from the first articulation axis A with respect to the second fastening station 51, as represented in FIGS. 2 to 7.

In the first fastening station 50 there is a holding seat 52 formed in the actuation arm 20.

The holding seat 52 extends along the first direction F between the first 24 and the second surface 25 of the actuation arm 20.

The holding seat 52 comprises a first insertion opening 52*a* arranged at an end of the holding seat 52.

The first insertion opening 52*a* is formed on the first 24 or on the second surface 25 of the actuation arm 20.

The holding seat 52 is open on the portion 27 of the side surface 26 of the actuation arm defining a groove.

The holding seat 52 can be engaged by an anti-rotation appendage 43 of the cable-clamping washer 40.

The anti-rotation appendage 43 extends substantially perpendicular to the inner surface 41 of the cable-clamping washer 40 and away from it.

As shown in FIG. 9, the anti-rotation appendage 43 projects from the outer edge 40*a* of the cable-clamping washer 40 joining to the edge itself.

The anti-rotation appendage 43 has a first end 44 substantially aligned with an outer surface 45 opposite the inner surface 41 of the cable-clamping washer 40. A second end 46 of the anti-rotation appendage 43 is arranged going away from the inner surface 41 of the cable-clamping washer 40. The distance that separates the first 44 and the second end 46 of the anti-rotation appendage 43 defines the length of the appendage itself.

In the preferred embodiment of the solution, the anti-rotation appendage 43 has a substantially prismatic shape in which the first 44 and the second 46 end are parallel to one another.

The insertion of the anti-rotation appendage 43 in the holding seat 52 determines a stable and predetermined angular position of the cable-clamping washer 40 with respect to the actuation arm 20.

The insertion of the anti-rotation appendage 43 in the holding seat 52 also determines a first contact surface 53 for the control cable 100. The first contact surface 53 defines a point or area of application of the traction force of the control cable 100 on the actuation arm 20.

Figure 2:
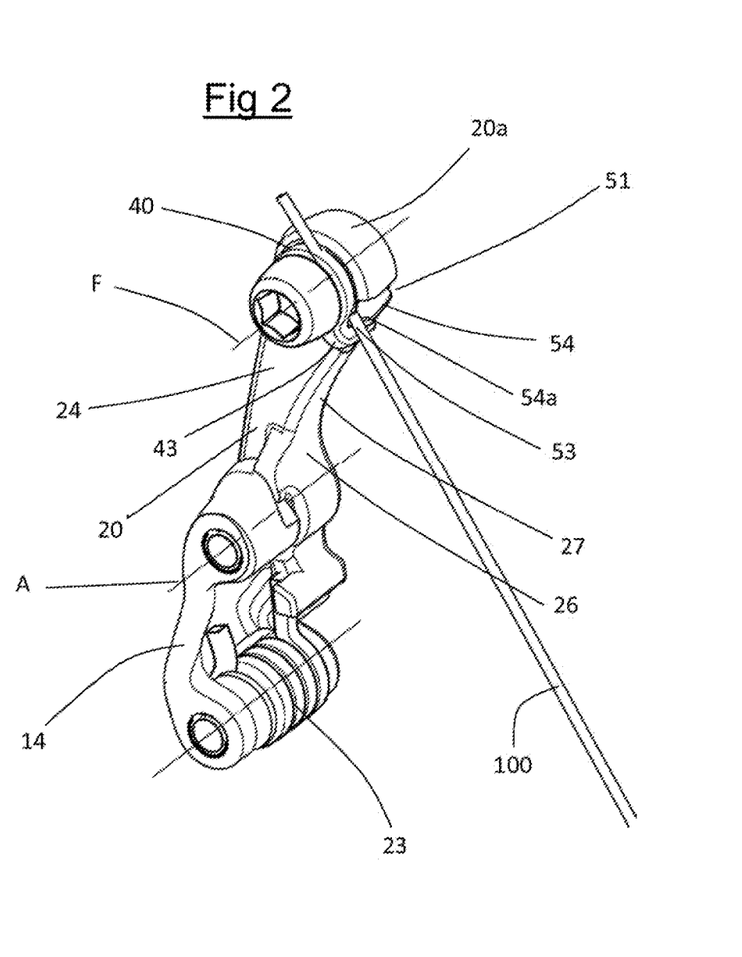
FIG. 2 is a perspective view of a first embodiment of some details of the derailleur of FIG. 1 in a first operative configuration.
Figure 4:
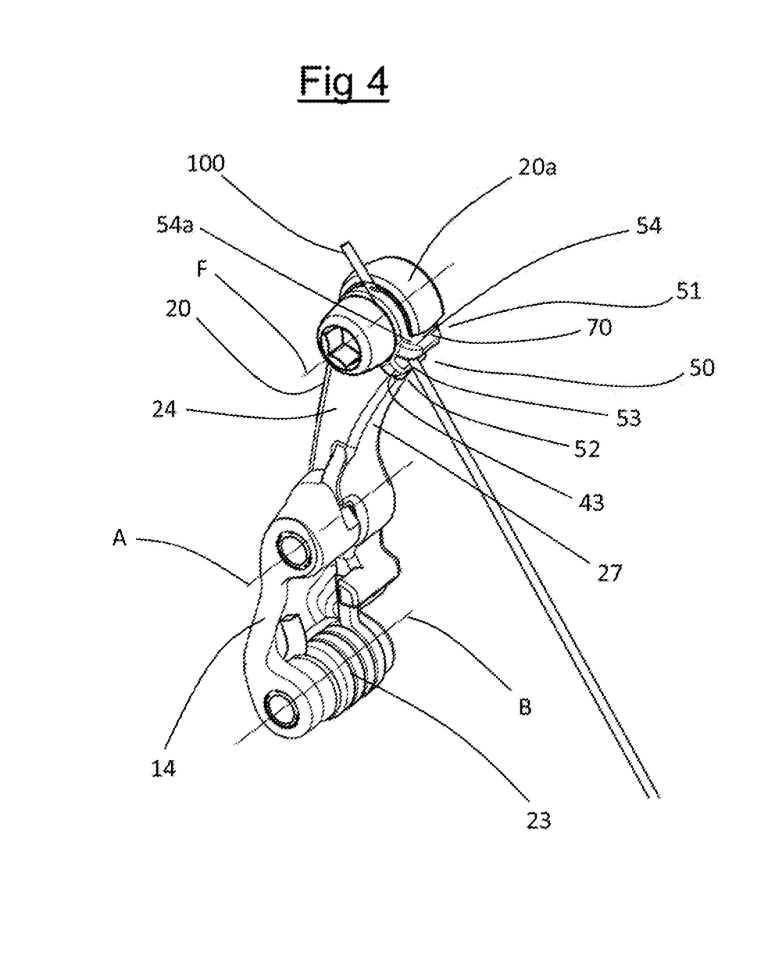
FIG. 4 is a perspective view of a second embodiment of some details of the derailleur of FIG. 1 in a first operative configuration.
Figure 6:
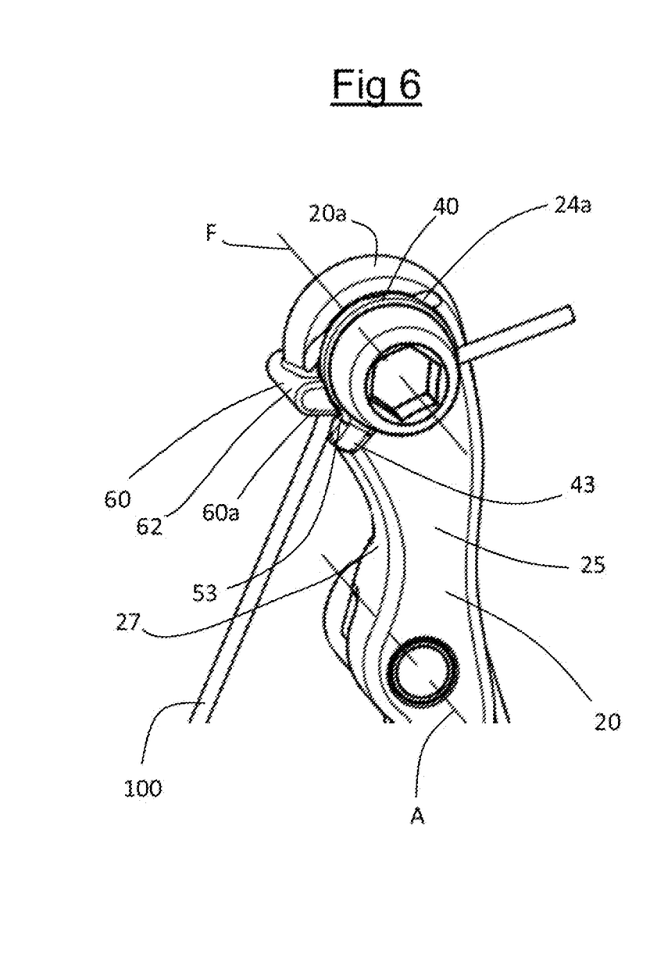
FIG. 6 is a perspective view of a third embodiment of some details of the derailleur of FIG. 1 in a first operative configuration.

In particular, as shown in FIGS. 2, 4 and 6 when the anti-rotation appendage 43 of the cable-clamping washer 40 is inserted in the holding seat 52 the first fastening station 50 can be used to fasten the control cable 100 to the actuation arm 20, making the first fastening station 50 operative.

The first contact surface 53 is arranged on an upper surface 47 of the anti-rotation appendage 43 facing towards the second fastening station 51.

In other words, the first contact surface 53 is arranged on an upper surface 47 of the anti-rotation appendage 43 facing the opposite way with respect to the first articulation axis A.

The holding seat 52 and the first contact surface 53 are oriented so as not to deviate the path of the control cable 100 or to deviate it by a few degrees (comprised between 0° and 15°).

In other words, the holding seat 52 and the first contact surface 53 make it possible to constrain the control cable 100 on the actuation arm 20 so that the portion of control cable held between the cable-clamping washer 40 and the actuation arm 20 is substantially aligned with, or inclined by a few degrees with respect to, the portion of control cable 100 that reaches the derailleur 10.

The first contact surface 53 is defined by the portion of anti-rotation appendage 43 that deviates the path of the control cable 100, or that, in the case in which the control cable 100 is not deviated, is in contact with the control cable 100.

In a first and second embodiment illustrated in FIGS. 2 to 5, in the second fastening station 51 there is a further holding seat 54 formed in the actuation arm 20.

The further holding seat 54 extends along the first direction F between the first 24 and the second surface 25 of the actuation arm 20 in a position further from the first articulation axis A with respect to the holding seat 52.

The further holding seat 54 comprises a first insertion opening 54*a* arranged at an end of the further holding seat 54.

The first insertion opening 54*a* is formed on the first 24 or the second surface 25 of the actuation arm 20.

The further holding seat 54 is open on the portion 27 of the side surface 26 of the actuation arm defining a groove.

Figure 3:
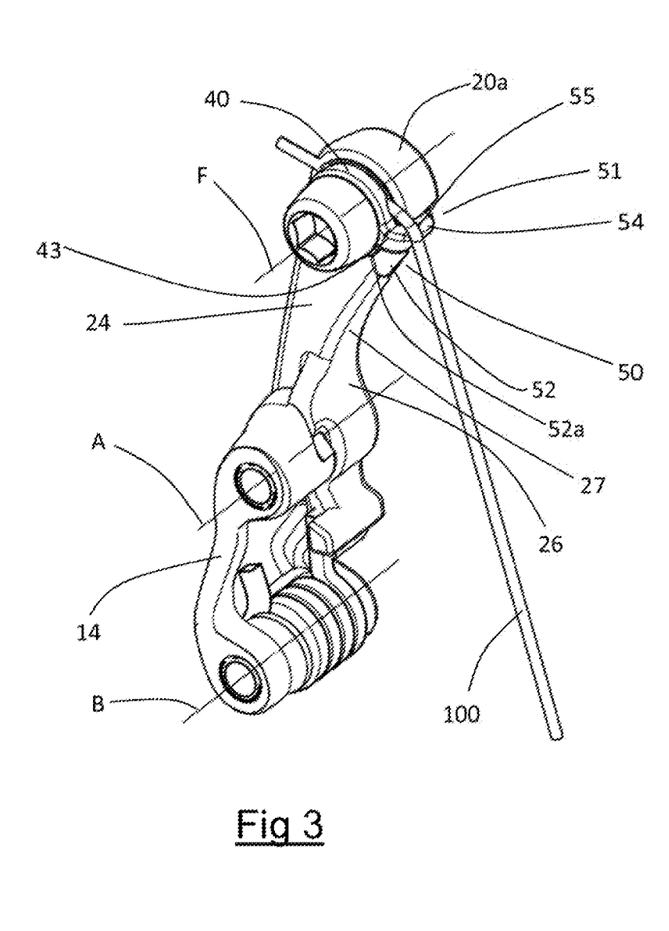
FIG. 3 is a perspective view of the details of FIG. 2 in a second operative configuration.

In the first embodiment illustrated in FIGS. 2 and 3, the further holding seat 54 is engageable by the anti-rotation appendage 43 of the cable-clamping washer 40.

The insertion of the anti-rotation appendage 43 in the further holding seat 54 determines a stable and predetermined angular position of the cable-clamping washer 40 with respect to the actuation arm 20.

The insertion of the anti-rotation appendage 43 in the further holding seat 54 makes a second contact surface 55 for the control cable 100. The second contact surface 55 defines a point or area of application of the traction force of the control cable 100 on the actuation arm 20.

In particular, as shown in FIG. 3, when the anti-rotation appendage 43 of the cable-clamping washer 40 is inserted in the further holding seat 54, the second fastening station 51 can be used to fasten the control cable 100 to the actuation arm 20, making the second fastening station 51 operative.

The second contact surface 55 is arranged on a side surface 48 of the anti-rotation appendage 43 facing the opposite way with respect to the further holding seat 54.

The further holding seat 54 and the second contact surface 55 are oriented so as to significantly deviate (by more than 15°) the path of the control cable 100.

In other words, the further holding seat 54 and the second contact surface 55 make it possible to constrain the control cable 100 on the actuation arm 20 so that the portion of control cable held between the cable-clamping washer 40 and the actuation arm 20 is significantly inclined with respect to the portion of control cable 100 that reaches the derailleur 10.

The second contact surface 55 is defined by the portion of anti-rotation appendage 43 that deviates the path of the control cable 100.

As schematically illustrated in FIGS. 10 and 11, the first contact surface 53 is arranged a shorter distance with respect to the second contact surface 55 from the plane P that contains both the first A and the second articulation axis B.

The movement ratio determined by the first contact surface 53 is greater than the movement ratio determined by the second contact surface 55.

The cable-clamping washer 40 foresees at least one, preferably two, cable-guiding grooves 49*a* and 49*b* defined on the inner surface 41 thereof, to accompany in a held manner the portion of control cable 100 arranged between the cable-clamping washer 40 itself and the actuation arm 20.

The first cable-guiding groove 49*a* extends perpendicular to the anti-rotation appendage 43 and crosses the entire inner surface 41 opening at both ends on the outer edge 40*a* of the cable-clamping washer 40. The depth of the first cable-guiding groove 49*a* is substantially constant along the entire extension of the groove itself.

The depth of the first cable-guiding groove 49a is smaller than the diameter of the control cable 100.

The second cable-guiding groove 49b extends perpendicular to the anti-rotation appendage 43 and crosses the entire inner surface 41 opening at both ends on the outer edge 40a of the cable-clamping washer 40. The depth of the second cable-guiding groove 49b is substantially constant along the entire extension of the groove itself.

The depth of the second cable-guiding groove 49b is smaller than the diameter of the control cable 100.

The depths of the first 49a and second cable-guiding groove 49b are substantially identical.

The first 49a and the second cable-guiding groove 49b are parallel to one another and have substantially identical length.

As illustrated in FIG. 9, the first 49a and the second cable-guiding groove 49b are arranged on opposite sides of the hole 42 of the cable-clamping washer 40.

Figure 5:
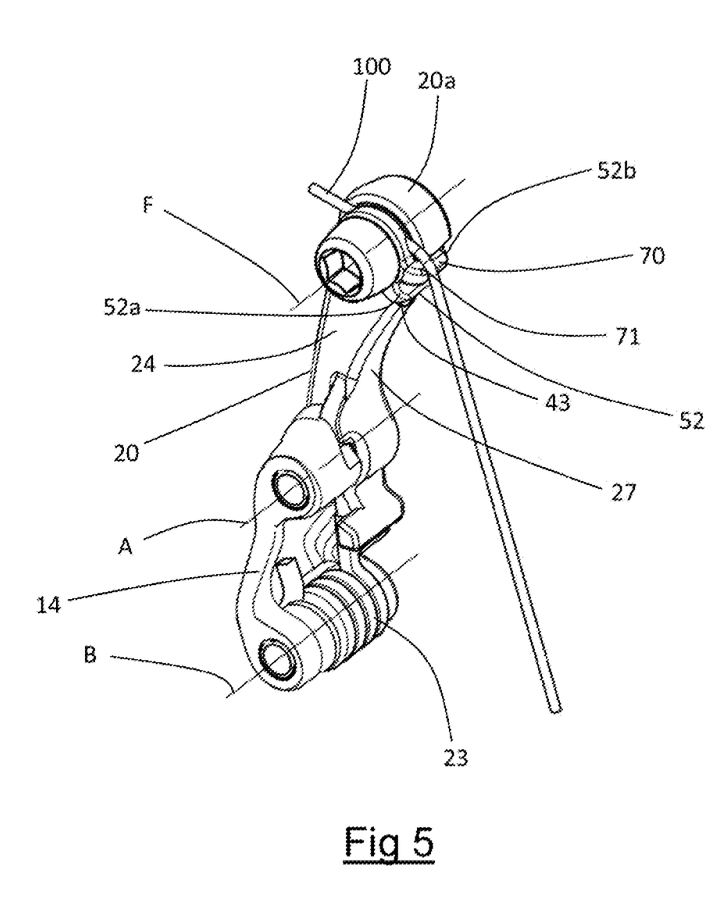
FIG. 5 is a perspective view of the details of FIG. 4 in a second operative configuration.

In the second embodiment illustrated in FIGS. 4 and 5, the further holding seat 54 is engaged by a further anti-rotation appendage 70 of the cable-clamping washer 40. In this embodiment, the cable-clamping washer 40 comprises two anti-rotation appendages 43, 70, as schematically indicated in FIG. 9A.

The insertion of the further anti-rotation appendage 70 in the further holding seat 54 contributes to determining a stable and predetermined angular position of the cable-clamping washer 40 with respect to the actuation arm 20.

The insertion of the further anti-rotation appendage 70 in the further holding seat 54 makes a second contact surface 71 for the control cable 100. The second contact surface 71 defines a point or area of application of the traction force of the control cable 100 on the actuation arm 20.

In particular, as shown in FIG. 5, the further anti-rotation appendage 70 inserted in the further holding seat 54 makes the second fastening station 51 available for fastening the control cable 100 to the actuation arm 20.

The further anti-rotation appendage 70 is substantially identical in shape and size to the anti-rotation appendage 43.

The further anti-rotation appendage 70 extends from the outer edge 40a of the cable-clamping washer 40 on the same side as the anti-rotation appendage 40 and is angularly spaced from the latter along the outer edge 40a, as represented in FIG. 9A.

The second contact surface 71 is arranged on a side surface 72 of the anti-rotation appendage 43.

The further holding seat 54 and the second contact surface 71 are oriented so as to significantly deviate the path of the control cable 100 (by more than 15°).

In other words, the further holding seat 54 and the second contact surface 71 make it possible to constrain the control cable 100 on the actuation arm 20 so that the portion of control cable held between the cable-clamping washer 40 and the actuation arm 20 is inclined with respect to the portion of control cable 100 that reaches the derailleur 10.

The second contact surface 71 is defined by the portion of anti-rotation appendage 70 that deviates the path of the control cable 100.

As schematically illustrated in FIGS. 10 and 11, the first contact surface 53 is arranged a shorter distance with respect to the second contact surface 71 from the plane P that contains both the first A and the second articulation axis B.

The movement ratio determined by the first contact surface 53 is greater than the movement ratio determined by the second contact surface 71.

In order to accompany in a held manner the portion of control cable 100 arranged between the cable-clamping washer 40 and the actuation arm 20, on the inner surface 41 of the cable-clamping washer 40 there is at least one, preferably two, cable-guiding grooves.

The first cable-guiding groove extends perpendicular to the anti-rotation appendage 43 and crosses the entire inner surface 41 opening at both ends on the outer edge 40a of the cable-clamping washer 40. The depth of the first cable-guiding groove is substantially constant along the entire extension of the groove itself.

The depth of the first cable-guiding groove is smaller than the diameter of the control cable 100.

The second cable-guiding groove extends perpendicular to the further anti-rotation appendage 70 and crosses the entire inner surface 41 opening at both ends on the outer edge 40a of the cable-clamping washer 40. The depth of the second cable-guiding groove is substantially constant along the entire extension of the groove itself.

The depth of the second cable-guiding groove is smaller than the diameter of the control cable 100.

The depths of the first and second cable-guiding groove 49b are substantially identical.

The first and second cable-guiding groove are at an angle, in other words they intersect one another.

Alternatively, the first and/or second cable-guiding grooves are formed on the actuation arm 20.

Figure 7:
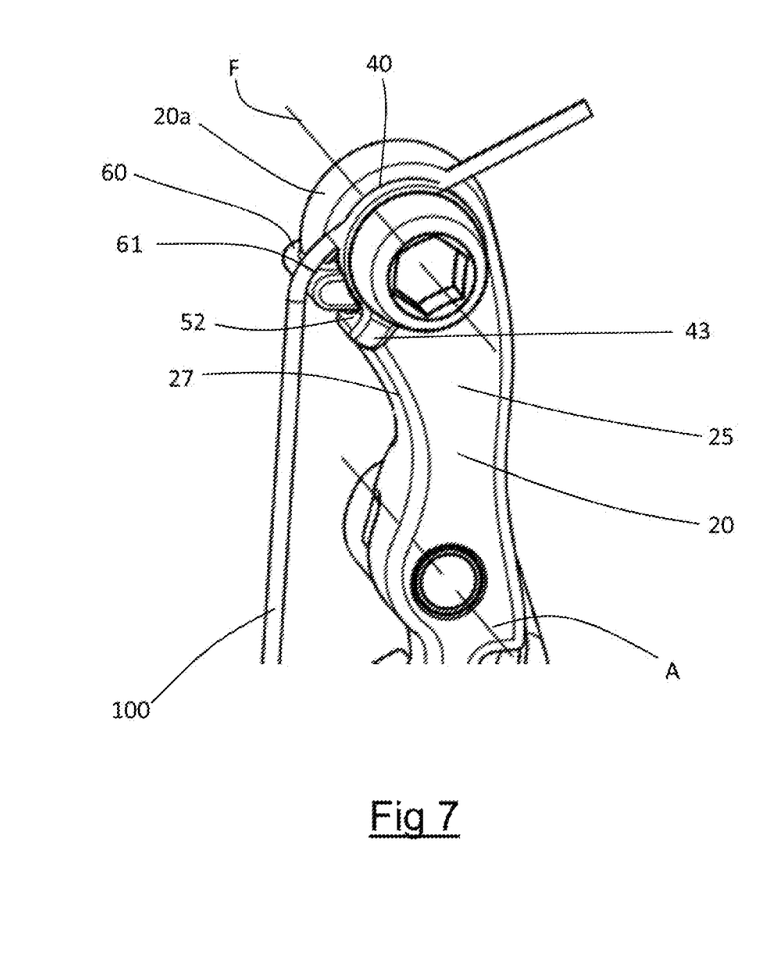
FIG. 7 is a perspective view of the details of FIG. 6 in a second operative configuration.

In a third embodiment illustrated in FIGS. 6 and 7, in the second fastening station 51 there is a projection 60 emerging from the actuation arm 20 and in one piece with it.

The projection 60 extends along the first direction F and is arranged a greater distance from the first articulation axis A with respect to the holding seat 52.

The projection 60 comprises at least one first portion 60a extending beyond the first 24 or the second surface 25 of the actuation arm 20 along the first direction F.

The projection 60 has an elongated shape that extends along the first direction F.

When the second fastening station 51 is used, the projection 60 acts as a cable-bending element for the control cable 100.

In particular, as shown in FIG. 7, the projection 60 has a second contact surface 61 which deviates the path of the control cable 100 before it reaches the cable-clamping washer 40 to be held on the actuation arm 20.

The second contact surface 61 is arranged on a front surface 62 of the projection 60 facing the opposite way with respect to the cable-clamping washer 40 and preferably arranged at the first portion 60a.

The projection 60 and the second contact surface 61 are oriented so as to significantly deviate the path of the control cable 100 (by more than 15°).

In other words, the projection 60 and the second contact surface 61 make it possible to constrain the control cable 100 on the actuation arm 20 so that the portion of control cable held between the cable-clamping washer 40 and the actuation arm 20 is inclined with respect to the portion of control cable 100 that reaches the derailleur 10.

As schematically illustrated in FIGS. 10 and 11, the first contact surface 53 is arranged a shorter distance with respect to the second contact surface 61 from the plane P that contains both the first A and the second articulation axis B.

The movement ratio determined by the first contact surface 53 is greater than the movement ratio determined by the second contact surface 61.

In order to accompany in a held manner the portion of control cable 100 arranged between the cable-clamping washer 40 and the actuation arm 20 when the second fastening station 51 is used, on the first surface 24 of the actuation arm there is a cable-guiding groove 24a (illustrated in FIG. 6).

The cable-guiding groove 24a crosses the entire first surface 24 of the actuation arm along a direction perpendicular to the first direction F. The depth of the cable-guiding groove 24a is substantially constant along the entire extension of the groove itself.

The depth of the cable-guiding groove 24a is smaller than the diameter of the control cable 100.

The cable-guiding groove 24a extends from the projection 60 and proceeds with an inclination with respect to the direction of extension of the projection 60, so as to guide the control cable 100 after the deviation actuated by the projection 60.

In use, in the case in which the movement ratio must be increased, the control cable 100 is fastened to the actuation arm at the first fastening station 50.

In particular, the anti-rotation appendage 43 of the cable-clamping washer 40 is introduced in the insertion opening 52a of the holding seat 52 with the control cable 100 that, resting on the anti-rotation appendage 43, is inserted in a cable-guiding groove 49a of the cable-clamping washer 40.

The resting area of the control cable 100 on the anti-rotation appendage 43 defines the first contact surface 53.

The hole 42 of the cable-clamping washer 40 is engaged by the bolt 32 which is screwed into the ferrule 30 inserted in the through hole in the actuation arm 20.

By tightening the bolt 32, the head 32a thereof presses the cable-clamping washer 40 against the first surface 24 of the actuation arm 20 stably constraining the control cable 100.

In the case in which the movement ratio must be decreased, the control cable 100 is fastened to the actuation arm at the second fastening station 51.

When the first embodiment is used, the anti-rotation appendage 43 of the cable-clamping washer 40 is inserted in the insertion opening 54a of the further holding seat 54 with the control cable 100 that, resting on the anti-rotation appendage 43, is inserted in a cable-guiding groove 49a of the cable-clamping washer 40.

The resting area of the control cable 100 on the anti-rotation appendage 43 defines the second contact surface 55.

The hole 42 of the cable-clamping washer 40 is engaged by the bolt 32 which is screwed into the ferrule 30 inserted in the through hole in the actuation arm 20.

By tightening the bolt 32, the head 32a thereof presses the cable-clamping washer 40 against the respective surface 24 of the actuation arm 20 stably constraining the control cable 100.

When the second embodiment is used, the further anti-rotation appendage 70 of the cable-clamping washer 40 is already inserted in the insertion opening 54a of the further holding seat 54 with the control cable 100 that, resting on the further anti-rotation appendage 70, is inserted in a cable-guiding groove.

The resting area of the control cable 100 on the further anti-rotation appendage 70 defines the second contact surface 71.

The hole 42 of the cable-clamping washer 40 is engaged by the bolt 32 which is screwed into the ferrule 30 inserted in the through hole in the actuation arm 20.

By tightening the bolt 32, the head 32a thereof presses the cable-clamping washer 40 against the respective surface of the actuation arm 20 stably constraining the control cable 100.

When the third embodiment is used, the control cable 100 is arranged resting on the portion 60a of the projection 60 that projects beyond the first 24 or the second surface 25 of the actuation arm.

The cable-clamping washer 40 is positioned on the corresponding surface 24 of the actuation arm 20 and the anti-rotation appendage 43 is inserted in the first insertion opening 52a of the holding seat 52.

The hole 42 of the cable-clamping washer 40 is engaged by the bolt 32 which is screwed into the ferrule 30 inserted in the through hole in the actuation arm 20.

By tightening the bolt 32, the head 32a thereof presses the cable-clamping washer 40 against the actuation arm 20 stably constraining the control cable 100.

Of course, those skilled in the art can bring numerous modifications and variants to the solution described above, in order to satisfy specific and contingent requirements, like for example foreseeing cable-guiding grooves on the actuation arm as an alternative to or in combination with the cable-guiding grooves of the cable-clamping washer, all in any case covered by the scope of protection of the present solution as defined by the following claims.

What is claimed is:

1. A bicycle derailleur, comprising:
   a chain guide configured to interact with a transmission chain of the bicycle and movable between a plurality of intermediate positions comprised between an inner position and an outer position;
   a fixed body adapted for being fixedly associated with a part of frame of the bicycle;
   an outer connection element rotatably connected to the fixed body about a first articulation axis (A) and rotatably connected to the chain guide about a second articulation axis (B) parallel to the first articulation axis (A);
   an inner connection element rotatably connected to the fixed body about a third articulation axis (C) and to the chain guide about a fourth articulation axis (D);
   an actuation arm hinged to the fixed body about the first articulation axis (A);
   a cable-clamping washer configured for being fixedly connected to the actuation arm and configured for locking a control cable on the actuation arm,
   a first fastening station defining a holding seat on said actuation arm, and a second fastening station defining a further holding seat on said actuation arm, said holding seat and said further holding seat are each formed as grooves on a side surface of the actuation arm, and said cable-clamping washer is configured to fasten the control cable in different positions on the actuation arm; and
   an anti-rotation appendage projecting from said cable-clamping washer and configured for being inserted in the holding seat of the first fastening station or the further holding seat of the second fastening station.

2. The derailleur according to claim 1, wherein said anti-rotation appendage comprises a first contact surface adapted for supporting the control cable in a selected holding seat.

3. The derailleur according to claim 2, wherein said anti-rotation appendage and said holding seat of the actuation arm extend along directions parallel to said first articulation axis (A).

4. The derailleur according to claim 3, wherein the cable-clamping washer is switchable so as to be inserted in the further holding seat of the actuation arm; said anti-rotation appendage having a second contact surface for the control cable.

5. The derailleur according to claim 2, wherein the cable-clamping washer is switchable so as to be inserted in the further holding seat of the actuation arm; said anti-rotation appendage having a second contact surface for the control cable.

6. The derailleur according to claim 2, wherein in the second fastening station said cable-clamping washer comprises a further anti-rotation appendage adapted for being inserted in the further holding seat of the actuation arm; said further anti-rotation appendage having a second contact surface for the control cable.

7. The derailleur according to claim 2, wherein said anti-rotation appendage, engaged with said holding seat, is positioned so that a distance between said first contact surface thereof and a plane containing the first articulation axis (A) and the second articulation axis (B) is different from a distance between a second contact surface of the projection of the actuation arm and the plane itself.

8. The derailleur according to claim 1, wherein said anti-rotation appendage and said holding seat of the actuation arm extend along directions parallel to said first articulation axis (A).

9. The derailleur according to claim 8, wherein in the second fastening station said cable-clamping washer comprises a further anti-rotation appendage adapted for being inserted in the further holding seat of the actuation arm; said further anti-rotation appendage having a second contact surface for the control cable.

10. The derailleur according to claim 1, wherein the cable-clamping washer is switchable so as to be inserted in the further holding seat of the actuation arm; said anti-rotation appendage having a second contact surface for the control cable.

11. The derailleur according to claim 10, wherein said holding seat and said further holding seat extend according to directions that are parallel to one another and parallel to said anti-rotation appendage.

12. The derailleur according to claim 1, wherein said cable-clamping washer comprises a further anti-rotation appendage adapted for being inserted in the further holding seat of the actuation arm; said further anti-rotation appendage having a second contact surface for the control cable.

13. The derailleur according to claim 12, wherein said anti-rotation appendage is positioned so that a distance between a first contact surface thereof and a plane containing the first articulation axis (A) and the second articulation axis (B) is different from a distance between said second contact surface thereof and the plane, or between the second contact surface of said further anti-rotation appendage and the plane.

14. The derailleur according to claim 12, wherein said holding seat and said further holding seat extend according to directions that are parallel to one another and parallel to said anti-rotation appendage.

15. The derailleur according to claim 1, comprising a cable-guiding groove that is formed on a selective one of said cable-clamping washer and said actuation arm and is open between said cable-clamping washer and said actuation arm.

16. The derailleur according to claim 1, wherein said derailleur is a front derailleur.

* * * * *